United States Patent
Huang et al.

(10) Patent No.: US 6,914,970 B2
(45) Date of Patent: Jul. 5, 2005

(54) MONITORING AND OVERRIDING FEATURES FOR TELEPHONE SERVICE SYSTEM

(75) Inventors: Alexander Lisheng Huang, Austin, TX (US); Jeffery Paul Johnson, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 560 days.

(21) Appl. No.: 09/873,943

(22) Filed: Jun. 4, 2001

(65) Prior Publication Data

US 2002/0181688 A1 Dec. 5, 2002

(51) Int. Cl.[7] ................................................ H04M 1/64
(52) U.S. Cl. ............................. 379/211.02; 379/211.01
(58) Field of Search ....................... 379/211.01–211.04, 379/213.01, 210.01, 210.02, 88.18, 88.26, 88.12, 88.13, 67.1, 215.01, 88.17, 207.01, 202.01

(56) References Cited

U.S. PATENT DOCUMENTS

| | | | |
|---|---|---|---|
| 4,578,540 A | 3/1986 | Borg et al. ..................... 179/2 |
| 5,563,935 A | 10/1996 | Small .......................... 379/199 |
| 5,712,902 A | 1/1998 | Florance et al. .............. 379/89 |
| 5,923,744 A | 7/1999 | Cheng ......................... 379/207 |
| 5,943,408 A | 8/1999 | Chen et al. ............... 379/88.24 |
| 5,983,096 A | * 11/1999 | Lietha et al. ................ 455/416 |
| 5,991,367 A | 11/1999 | Robuck .................... 379/88.24 |
| 6,014,436 A | 1/2000 | Florence et al. ............. 379/210 |
| 6,021,176 A | * 2/2000 | McKendry et al. ........... 379/35 |
| 6,101,249 A | 8/2000 | Weber ......................... 379/188 |
| 6,310,939 B1 | * 10/2001 | Varney ..................... 379/88.01 |
| 6,493,432 B1 | * 12/2002 | Blum et al. .............. 379/88.12 |
| 6,529,587 B1 | * 3/2003 | Cannon et al. .......... 379/88.18 |
| 6,639,972 B1 | * 10/2003 | Cannon et al. .......... 379/88.18 |
| 6,661,886 B1 | * 12/2003 | Huart et al. ........... 379/215.01 |
| 2002/0076007 A1 | * 6/2002 | Gibson et al. |
| 2003/0108172 A1 | * 6/2003 | Petty et al. |

FOREIGN PATENT DOCUMENTS

WO  WO 99/23845  5/1999  ............ H04M/1/57

* cited by examiner

Primary Examiner—William J. Deane, Jr.
(74) Attorney, Agent, or Firm—Brinks Hofer Gilson & Lione

(57) ABSTRACT

A system and method are disclosed for a user to monitor and/or override a forwarded call. Typically, the forwarded call was initially an incoming call from a caller to the user and thereafter forwarded to a remote service system, such as a remote messaging system. The system and method determine a redirecting number from which the incoming call was forwarded. The system and method then initiates a second call to the user and a voice path is established connecting the forwarded call to the second call. Thereafter, the user is notified, for example, with a distinct ring at the user's telephone, of the option that the user may monitor and override the forwarded call. The system and method can also execute procedures to actuate the options elected by the user.

24 Claims, 3 Drawing Sheets

MONITORING AND OVERRIDING FEATURES FOR TELEPHONE SERVICE SYSTEM

FIELD OF THE INVENTION

The invention relates to a system and method for a user to monitor and override a backup call receiving system or service to which an incoming telephone call intended for the user has been forwarded.

BACKGROUND

A call to a telephone user is sometimes forwarded to a service such as messaging service or assisting agent service. Such services are typically provided by a telephony service system external to the switch that serves the user's telephone line. Compared to a home answering machine, these service systems may be advantageous since they can provide more storage capacity and enable record tracking and post-call processing such as information redistribution.

Unlike the home answering machine, however, these service systems typically do not provide a way for the user to listen to the forwarded call while the interaction between the caller and the service system is in progress, e.g., while the caller is leaving a message with a messaging service system. Thus, the user cannot monitor and/or override the handling of the call like they would be able to do on a home answering machine. Yet, the user of the messaging service or assisting agent service often desires such monitoring and/or overriding of the service.

Some switch vendors provide a screening function from a serving switch which alerts the user about a call intercepted by a messaging or attendant system, and allows the user to screen the call. The cost of this switch function, however, is typically prohibitive. Another difficulty of the switch approach is that a switch operator cannot determine whether a call has been forwarded to a backup service system for which screening options are desired, or to another destination where such options are not desired. Moreover, most switches today do not include a call screening function and the call screening function is not available to users and/or call backup service providers served by such switches.

Thus, there is a need for an improved call monitoring and overriding system and method to handle the calls forwarded to a service system.

BRIEF SUMMARY

A system and method are disclosed for a user to monitor on a call-by-call basis a call forwarded to a system or service, such as a remote messaging system. In addition, the user may elect to override the service to which the call has been forwarded, i.e., to connect to the caller and disconnect the system service. Typically, the forwarded call was initially an incoming call from a calling party to the user and thereafter forwarded to a remote service system. Since the service system is remotely located, the user cannot otherwise screen the forwarded call as he or she could with a home answering machine. A monitoring and service system overriding function can be added as a component of the service system or it can be an independent subsystem used in conjunction with the service system.

Thus, after an incoming call is forwarded, the monitoring and service system overriding function determines a redirecting number of the user from which the incoming call was forwarded. The monitoring and service system overriding function then initiates a second call to the user and establishes a one-way voice path connecting the forwarded call to the second call. Thereafter, the user is notified, for example, with a distinct ring at the user's telephone, that the user may monitor the forwarded call via the established one-way voice path. The user may pick up the phone to do so, and may then choose to connect directly to the caller via a two-way voice path, and disconnect the forwarded call from the remote service.

Further aspects and advantages of the invention are discussed below in conjunction with the preferred embodiments.

DETAILED DESCRIPTION

A call monitoring and service system overriding system is provided in a communication environment that allows a system user ("user") to monitor and, at the user's option, connect to a call that has been forwarded to a remote service system. The remote service system may be, for example, a backup system such as a messaging system, an answering service, a third party's phone and a unified messaging system. For simplicity of description, the term telephone system is used herein where the term communication environment could also be used. Also, the term telephone line is used herein, where the term communication line could be otherwise used. The telephone line can be a line shared by telephone and data network access services, or can be another telephone line, or other lines, physically or logically separate.

Figure 1:
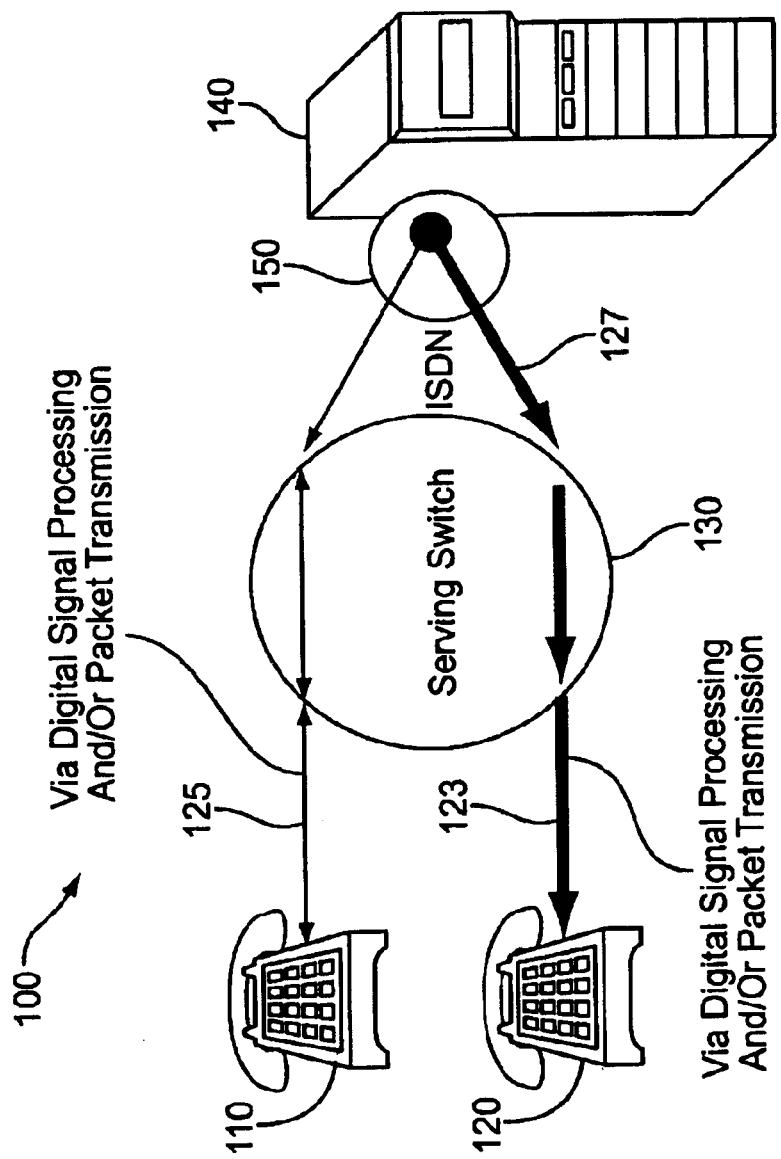
FIG. 1 is a block diagram of an exemplary system for providing a monitoring and service system overriding feature according to the preferred embodiments.

FIG. 1 illustrates a communication environment, such as telephone system 100. The telephone system 100 connects via telephone lines a calling party ("caller") 110 to a called party, i.e., a user 120 of monitoring and overriding service. A serving switch 130 connects a calling party telephone line 125 to the called party's telephone line 123 to direct an incoming call from the caller 110 to the user 120.

When the user's telephone is busy, the user does not otherwise answer the incoming call, or as set up by the user, the incoming call is forwarded to a remote service system 140. Telephony trunks capable of conveying caller and redirecting numbers, such as Integrated Services Digital Network (ISDN) trunks, connect the serving switch 130 to the remote service system 140. The remote service system 140 includes a message system, for example, voice-mail, and an answering service automatic call distribution system, such as when a call center agent answers the forwarded call and takes a message. Other types of remote service systems 140 could also be used, such as, automatically sending the call to a third party's phone, e.g., a colleague's phone, or sending the call to a unified messaging service. The unified messaging service is a service that allows for the storage and retrieval of message in various media formats and that, for example, converts an e-mail text message to a voice message or vice versa.

To provide for the monitoring and service system overriding service without a screening function included in the serving switch, a bridge and control component 150 is added to the remote service system 140. The bridge and control component 150 determines if the called party of a given forwarded call has the monitoring and/or overriding service registered and activated. The bridge and control component 150 also alerts the user about the monitoring opportunity. The bridge and control component 150 bridges the user 120 into the monitoring session and can detect the user's intention to override the service system. If the user 120 indicates a desire to override the service system, the bridge and control component 150 sets up two-way voice path between the caller and the user and requests the serving switch 130 to directly connect the caller 110 and user 120. The user 120 can signal his or her election to override the forwarded call by, for example, pressing a telephone key or speaking into the telephone handset.

Figure 2:
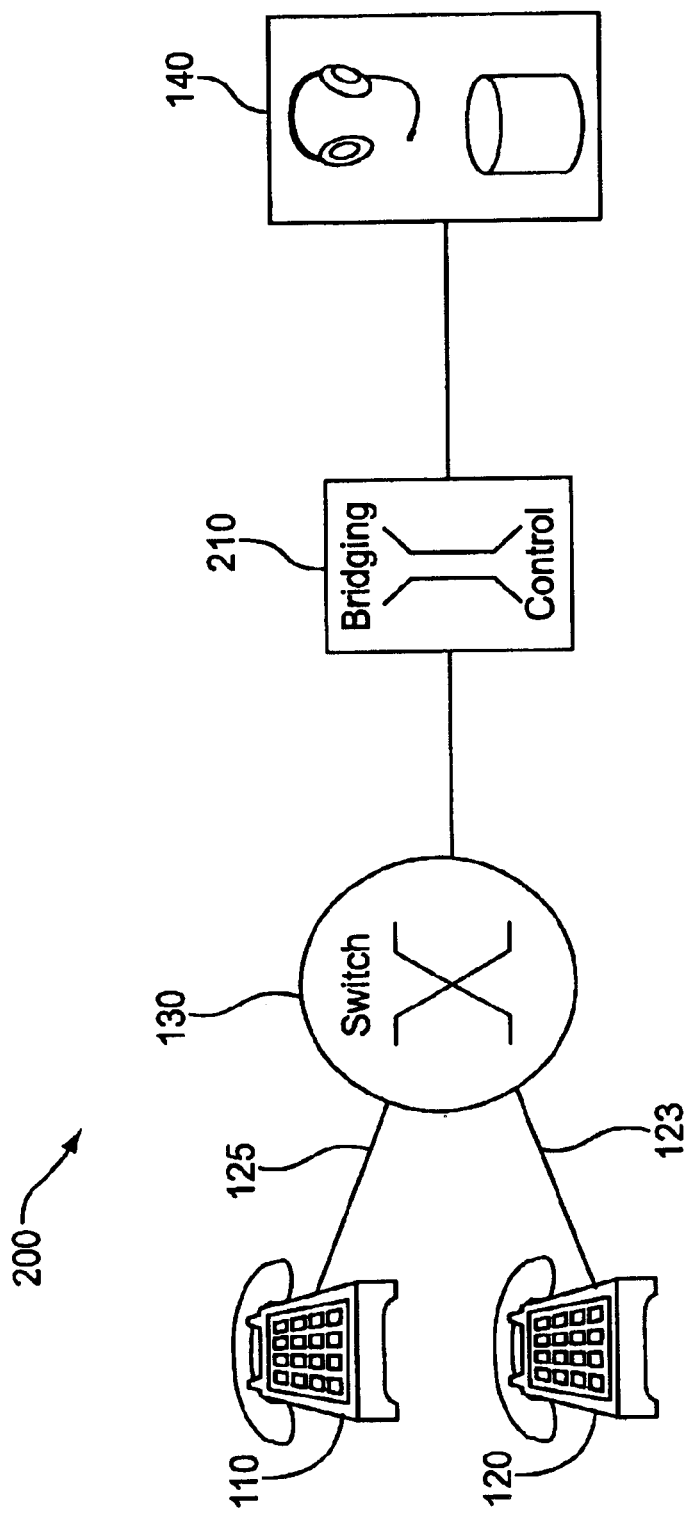
FIG. 2 is a block diagram of an alternate system for providing the monitoring and service system overriding feature according to the preferred embodiments.

FIG. 2 shows an alternate communication environment, such as telephone system 200, that also uses the call monitoring and overriding service of the preferred embodiments. The caller 110 connects to the user 120 via the telephone system 200. Telephone line 125 connects the caller 110 to the serving switch 130 and the serving switch 130 connects the caller 110 to the user 120 via the telephone line 123. Unlike the configuration shown in FIG. 1, the serving switch 130 is not directly connected to the remote service system 140, but connects through a bridge and control subsystem 210. The bridge and control subsystem 210 contains hardware, software, and data necessary to accomplish the monitoring and service system overriding functions of the forwarded call without modifying the original remote service system 140. The bridge and control subsystem 210 functions similarly to the bridge and control component 150 in FIG. 1.

Figure 3:
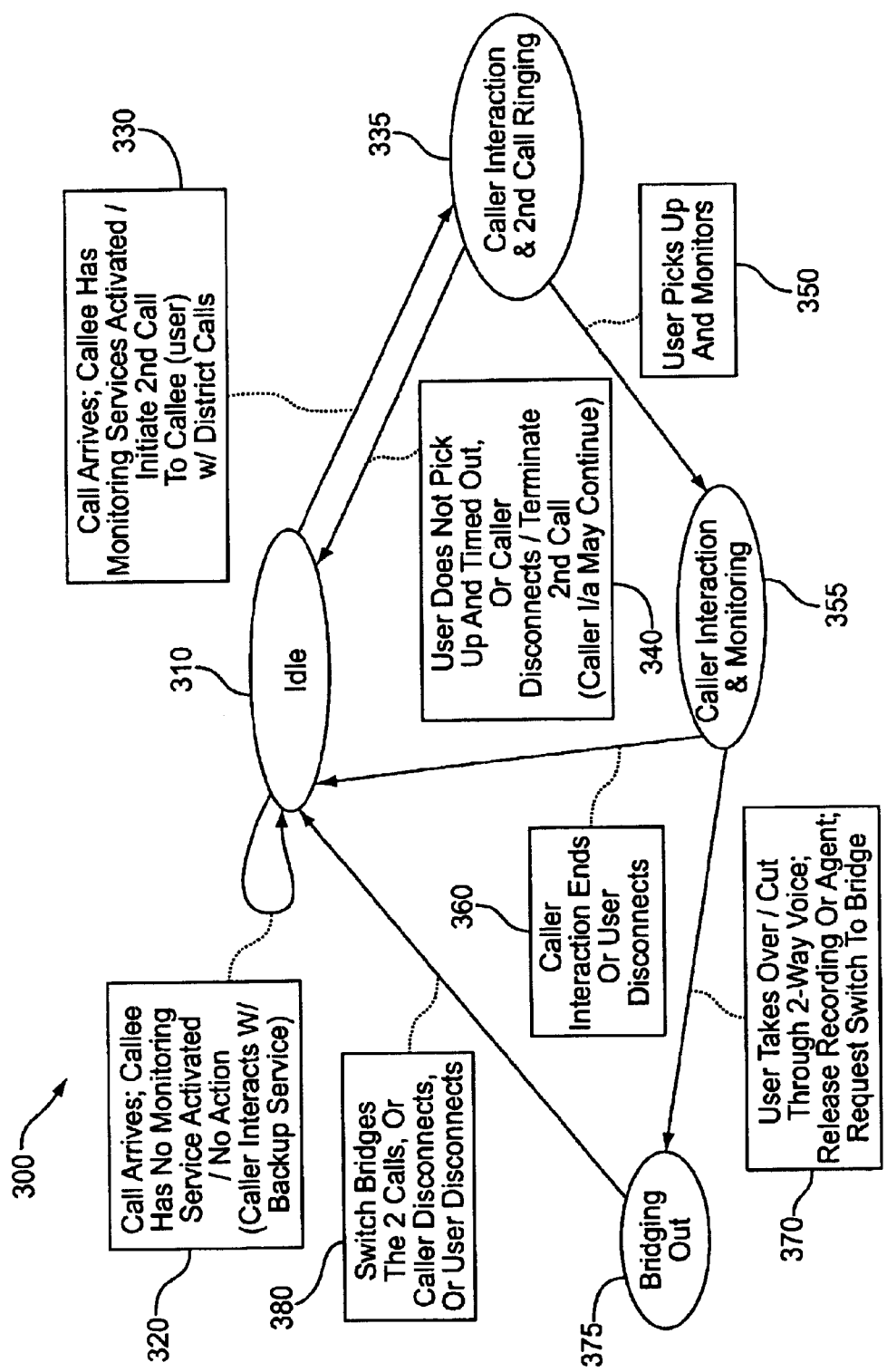
FIG. 3 is a state diagram illustrating the functionality of an application that provides the monitoring and service system overriding feature according to the preferred embodiments.

FIG. 3 shows a state diagram illustrating an application 300 that enables call monitoring and service system overriding functions according to the preferred embodiments. It should be noted that this diagram depicts a state machine for a single call handled by the monitoring and service overriding function, but the function can simultaneously handle multiple independent calls. The application 300 includes a program or process that resides on software, firmware or hardware, or combinations thereof. The application preferably resides with the bridging and control function as a subsystem 210 or as a component 150 in the remote service system 140.

To utilize the monitoring and overriding service, the user 120 preferably registers via a registration procedure. The registration procedure records that the user desires the ability to monitor and override calls forwarded from their telephone line 123. The user 120 preferably can also deregister from the monitoring and overriding service, and can activate or deactivate the service when registered. Various mechanisms can be used to register with or deregister (or activate or deactivate) from the monitoring and overriding service, including the user manually registering or deregistering with the service using a telephone. Other methods for registering and deregistering the user 120 could also be used, such as the user 120 using a world-wide web session to register with or deregister from the service.

Returning to FIG. 3, at state 310, the application 300 resides in an idle state before a call is forwarded to the remote service system 140. At block 320, the call arrives at the bridging and control subsystem 210 or component 150 with the condition that the called party is not registered as a monitoring service user 120 or the user has deactivated the monitoring service. In this case the service system interacts with the caller 110 normally, and the monitoring and overriding service is not invoked. The application 300 remains at the idle state (state 310).

In a preferred embodiment, to determine whether the called party is registered with the service and the service is activated, call-processing logic located at the bridging and control subsystem 210 or component 150 determines the called party's telephone number. For example, the call-processing logic can recognize a redirecting number in a call-setup-signaling message, which is the called party's telephone number. Thereafter, the called party's telephone number is compared with active registered users' telephone numbers to determine whether the called party is registered for the monitoring and overriding service.

At block 330, a call arrives at the bridging and control subsystem 210 or the remote service system 140 and the called party is a registered and active user 120. The application 300 initiates a second call to the user's telephone line 123 and connects the second call with the caller 110 via a one-way voice path. The one-way voice path allows the voice of the caller 110 to be audible to the user 120 without making the user's voice audible to the caller 110. The user 120 can be notified of the second call with a distinct ring as directed by the application 300 and provided by the serving switch 130. If the telephone line of user 120 is equipped with a caller identification (ID) device, the calling party's telephone information may appear as provided by the bridging and control subsystem 210 or component 150.

At state 335, the application 300 waits for a user interaction or for a timeout to occur while the caller 110 leaves a message with the remote service system 140 and the second call is being sent to the user 120. At block 340, when the user 120 fails to answer the second call before a determined time out period elapses or the caller 110 disconnects from the call, the application terminates the one-way voice path connection with the caller 110 and returns to the idle state (state 310).

At block 350, the user 120 answers the second call upon receipt of the second call. Thereafter, the user 120 can listen to the forwarded call, e.g., the interaction between the caller 110 and the remote service system 140 via the one-way voice path. The voice path can be implemented by the bridge and control subsystem 210 or the bridge and control component 150. Those skilled in the art with appreciate that that voice path can be implemented in other ways, such as with digital signaling processing and packet voice transmission and processing. At state 355, the application 300 waits while the user 120 monitors the caller's call to the remote answering service 140.

Upon listening to the caller 110, the user 120 can elect to override the forwarded call or disconnect from the call. At block 360, if the user 120 disconnects from the forwarded call or the caller interaction with the remote service system 140 ends, the application 300 terminates the one-way voice path and enters the idle state (state 310).

At block 370, the user 120 elects to override the forwarded call. The user 120 can signal his or her election to override the forwarded call by, for example, pressing a telephone key or speaking into the telephone handset. The user may speak a command into the telephone handset or merely say anything, depending on how the application 300 is set up. The application 300, upon detecting the pressed key or the user's voice, provides a two-way voice path between the user 120 and the caller 110. The application 300 also preferably detaches the caller 110 from the remote service system 140, for example, the recording or attendant leg of the forwarded call.

The bridge and control subsystem 210 or component 150 can request the serving switch 130 to bridge out the forwarded call and connect the caller 110 directly with the user 120. At block 375, the application 300 waits for the serving switch 130 to bridge out. At block 380, when the serving switch 130 bridges out the forwarded call and connects the caller 110 directly with the user 120, the application 300 can return to the idle state (state 310). The application 300 also returns to the idle state (state 310) if the caller 110 or the user 120 disconnects from the call before the bridging out occurs.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents, which are intended to define the scope of this invention.

We claim:

1. A method for notifying a user that the user may monitor a forwarded first call that was initially an incoming call to the user from a caller party and was thereafter forwarded to a remote service system, the method comprising:

determining with a system independent of a serving switch a redirecting number from which the incoming call was forwarded;

initiating a second call to the user;

establishing a one-way voice path connecting the forwarded call to the second call; and notifying the user that the user may monitor the forwarded call.

2. The method of claim 1 wherein notifying the user comprising sending a distinct ring from the serving switch to the user.

3. The method of claim 1 wherein the voice path is established using a bridging circuitry.

4. The method of claim 1 wherein the voice path is established using digital signaling processing.

5. The method of claim 1 wherein the voice path is established using packet voice transmission and processing.

6. The method of claim 1 further comprising:

providing a two-way voice path between the user and the caller; and detaching the remote service from the forwarded call.

7. The method of claim 6 wherein the two-way voice path is provided after the user elects to override the forwarded call.

8. The method of claim 7 wherein the user elects to override the forwarded call by pressing a telephone key.

9. The method of claim 7 wherein the user elects to override the forwarded call speaking into the telephone handset.

10. The method of claim 1 wherein the bridge and control component is incorporated with the remote service system.

11. The method of claim 1 wherein the bridge and control component is established independent of the remote service system.

12. The method of claim 1 wherein the system independent of the serving switch comprises a bridge and control component.

13. A system that notifies and allows a user to monitor a forwarded first call that was initially an incoming call to the user from a caller and was thereafter forwarded to a remote service system, the system comprising;

a system independent of a serving switch to determine a redirecting number from which the incoming call was forwarded and initiate a second call to the user and notify the user that the user may monitor the forwarded call, wherein the bridge and control subsystem or component establishes a one-way voice path connecting the forwarded call to the second call.

14. The system of claim 13 wherein the system independent of the serving switch comprises a bridge and control component.

15. The system of claim 14 wherein the bridge and control component directs the serving switch to send a distinct ring from the to the user to notify the user that the user may monitor the forwarded call.

16. The system of claim 14 wherein the bridge and control component directs the serving switch to provide a two-way voice path between the user and the caller and to detach the remote service from the forwarded call.

17. The system of claim 16 wherein the two-way voice path is provided after the user elects to override the forwarded call.

18. The system of claim 14 wherein the bridge and control component is incorporated with the remote service system.

19. The system of claim 14 wherein the bridge and control component is established independent of the remote service system.

20. The system of claim 13 wherein the voice path is established using a bridging circuitry.

21. The system of claim 13 wherein the voice path is established using digital signaling processing.

22. The system of claim 13 wherein the voice path is established using packet voice transmission and processing.

23. The system of claim 22 wherein the user elects to override the forwarded call by pressing a telephone key.

24. The system of claim 22 wherein the user elects to override the forwarded call speaking into the telephone handset.

* * * * *